United States Patent [19]

Curley et al.

[11] 3,796,996

[45] Mar. 12, 1974

[54] MAIN MEMORY RECONFIGURATION

[75] Inventors: John L. Curley, Sudbury; Benjamin S. Franklin, Boston, both of Mass.; Wallace A. Martland, Nashua, N.H.; Thomas J. Donahue, Hudson; Louis V. Cornaro, Billerica, both of Mass.

[73] Assignee: Honeywell Information Systems Inc., Waltham, Mass.

[22] Filed: Oct. 5, 1972

[21] Appl. No.: 295,417

[52] U.S. Cl. .............................................. 340/172.5
[51] Int. Cl. .............................................. G06f 3/00
[58] Field of Search .................................. 340/172.5

[56] References Cited

UNITED STATES PATENTS

| | | | |
|---|---|---|---|
| 3,106,698 | 10/1963 | Unger | 340/172.5 |
| 3,268,875 | 8/1966 | Schaffer | 340/172.5 |
| 3,564,505 | 2/1971 | Finnila et al. | 340/172.5 |
| 3,629,842 | 12/1971 | Taylor | 340/172.5 |
| 3,680,058 | 7/1972 | DeSantis et al. | 340/172.5 |
| 3,681,757 | 12/1972 | Allen et al. | 340/172.5 |
| 3,626,374 | 12/1971 | Chinlund | 340/172.5 |
| 3,686,640 | 12/1972 | Andersen et al. | 340/172.5 |

*Primary Examiner*—Paul J. Henon
*Assistant Examiner*—Michael Sachs
*Attorney, Agent, or Firm*—Nicholas Prasinos; Ronald T. Reiling

[57] ABSTRACT

An apparatus and a method for reconfiguring an $m$-module $m$-way interleaved main memory store to a $k$-way interleaved configuration where $k$ equals $m/2$. In a main memory store having m modules and operating in an n-way interleaved configuration L additional reconfiguration modes allow the isolation of any one bad module in the upper half of the memory addressing range, thus giving assurance of operation in the lower half of the memory addressing range. The remaining lower half of the memory system remains addressable so that diagnostic procedures may be run in that portion of memory simultaneously with the running of user programs on the other portion of memory.

6 Claims, 8 Drawing Figures

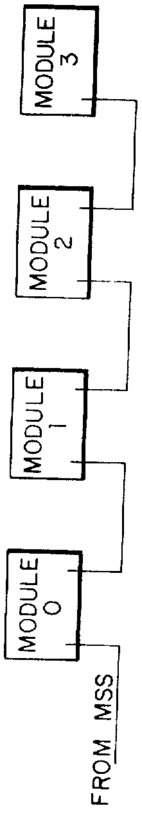
FIG. 1A
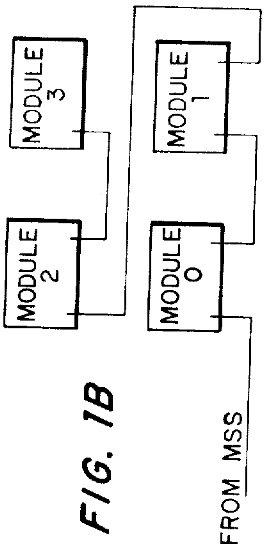
FIG. 1B
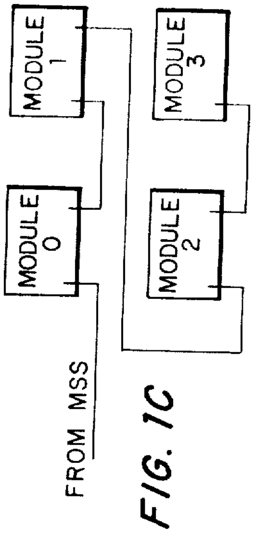
FIG. 1C
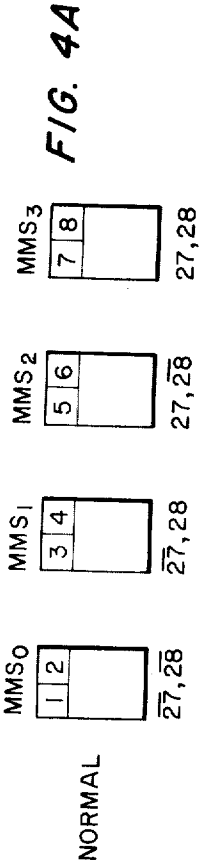
FIG. 4A
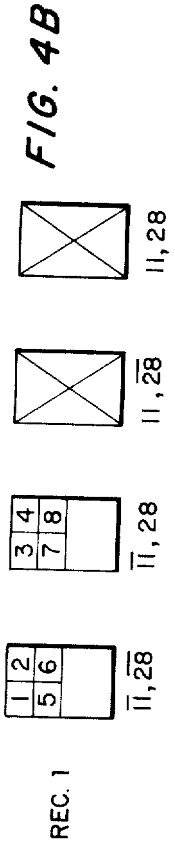
FIG. 4B
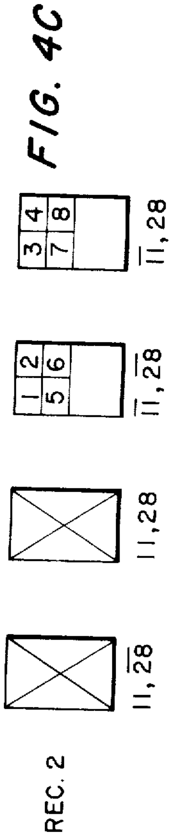
FIG. 4C
| CONFIGURATIONS | ADDRESS TO MMS | | | | | | | | | | | | | | | | | | | MODULE SELECT | |
|---|---|---|---|---|---|---|---|---|---|---|---|---|---|---|---|---|---|---|---|---|---|
| NORMAL | 8 | 9 | 10 | 11 | 12 | 13 | 14 | 15 | 16 | 17 | 18 | 19 | 20 | 21 | 22 | 23 | 24 | 25 | 26 | 27 | 28 |
| RECONFIGURED | 9 | 10 | 11 | 12 | 13 | 14 | 15 | 16 | 17 | 18 | 19 | 20 | 21 | 22 | 23 | 24 | 25 | 26 | 27 | 11 | 28 |
FIG. 3

PATENTED MAR 12 1974 3,796,996

MAIN MEMORY RECONFIGURATION

RELATED APPLICATIONS

The following applications are included herein by reference:

1. "Buffer Store" invented by J. L. Curley, T. J. Donahue, W. A. Martland, and B. S. Franklin, filed on the same date as the instant application, having Ser. No. 295,301 and assigned to the same assignee named herein.
2. "Variable Masking for Segmented Memory" invented by Wallace A. Martland and John L. Curley, filed on same date as the instant application, having Ser. No. 295,303 and assigned to the same assignee named herein.
3. "Override Hardware for Main Store Sequencer" invented by Thomas J. Donahue, filed on same date as the instant application, having Ser. No. 295,418 and assigned to the same assignee named herein.
4. "Main Memory Sequencer" invented by T. J. Donahue, John L. Curley, Benjamin S. Franklin, W. A. Martland, and L. V. Cornaro, filed on same date as the instant invention, having Ser. No. 295,331 and assigned to the same assignee named herein.

BACKGROUND OF THE INVENTION

1. Field of the Invention

This invention relates generally to computer storage systems and more particularly to a storage system having four memory modules capable of dynamic operation under program control in a four-way interleaved addressing scheme or a two-way interleaved addressing scheme.

2. Description of the Prior Art

In order to improve the performance of the computer system, improvements in the basic speed of the components and circuitry and also improvements through functional organization have been resorted to. In order to enhance the speed of a computer system through functional organization, one technique that has been resorted to is to divide main memory store into a number of storage modules that can be accessed in parallel. Moreover each module of main memory store may be organized into independent arrays. For example, in a two module system, module 1 contains array number 1 which contains all the even numbered addresses and module 2 contains the second array which contains all the odd numbered addresses. Storage locations therefore alternate between the two arrays and in this particular instance the storage has been arranged in what is known as a two-way interleaved storage. Storage systems may be $n$-way interleaved; however there is a practical upper limit imposed by hardware costs.

One major disadvantage of the interleaved addressing scheme is that failure in any one memory module would disable the entire system. It is desirable therefore to have more than one mode of interleaved addressing so that a system operating in an $m$-way interleaved mode may be reconfigured to operate in a $k$-way interleaved mode. Moreover it is also desirable that any portion of main store be addressable regardless of the configuration of the interleaved addressing scheme.

One prior art scheme describing memory interleaving and memory reconfiguration utilizing plug boards for reconfiguring memory is described on pages 16–25 of "A Guide to the IBM System/370 Model 165" published and copyrighted by IBM in 1970 and 1971.

OBJECTS

It is an object, therefore, of the invention to provide an improved computer storage system.

It is another object of the invention to provide a storage system having $m$ main memory modules which may have an $m$ and $k$-way interleaved addressing scheme.

It is still another object of the invention to provide a dynamic interleaved addressing scheme for m main memory modules that may be combined under program control in a predetermined number of groups, $R_1$, $R_2$ an interleaved addressing configuration $m$ or $k$ when $k$ equals $m/2$.

Other objects and advantages of the invention will become apparent from the following description of the preferred embodiment of the invention when read in conjunction with the drawings contained herewith.

SUMMARY OF THE INVENTION

The foregoing objects are achieved according to one embodiment of the instant invention by providing typically four main memory modules that may be arranged in a four-way or two-way interleaved addressing scheme. Normal operation of the system is in the four-way interleaved configuration. With failure in any one memory module, reconfiguration under program control produces a two-way interleaved system with at least half the memory capacity of the original system (addresses 0 to $X/2-1$, where $X$ equals original memory capacity) assured to function correctly. The remaining half of the memory system (addresses $X/2$ to $X-1$) remains addressable but access to this portion of the storage will produce unspecified results. The retention of full addressing to all of memory is a substantial aid to diagnostic procedures.

There are typically three configuration modes although other numbers may be used; the normal mode of operation is the no-error situation wherein the modules are arranged in the four-way interleaved addressing scheme. There are two reconfiguration modes R1 and R2 which allow the isolation of any one bad module in the upper half of the memory addressing range, giving assurance of operation in the lower half of the memory addressing range. This reconfiguration scheme has the additional benefit in that, of the six possible two-module failure situations, two of those combinations (i.e., failure of 0 and 1 module or failure of 2 and 3 module) can be reconfigured to give the same reduced capability as a 1 module failure case. Therefore in all of these cases reconfiguration R1 or R2 gives assurred memory operation in the lower half of memory and moreover addressability to all of memory, upper and lower.

BRIEF DESCRIPTION OF THE DRAWINGS

This invention will be described with reference to the accompanying drawings wherein:

FIGS. 1A–1C are block diagrams illustrating the three configuration modes.

FIG. 3 is a format of address bits used to address main memory store in the normal and reconfigured mode.

FIGS. 4A–4C illustrate in block diagram format the organization of main memory modules in each of the three configurations.

DESCRIPTION OF A PREFERRED EMBODIMENT

Figure 2:
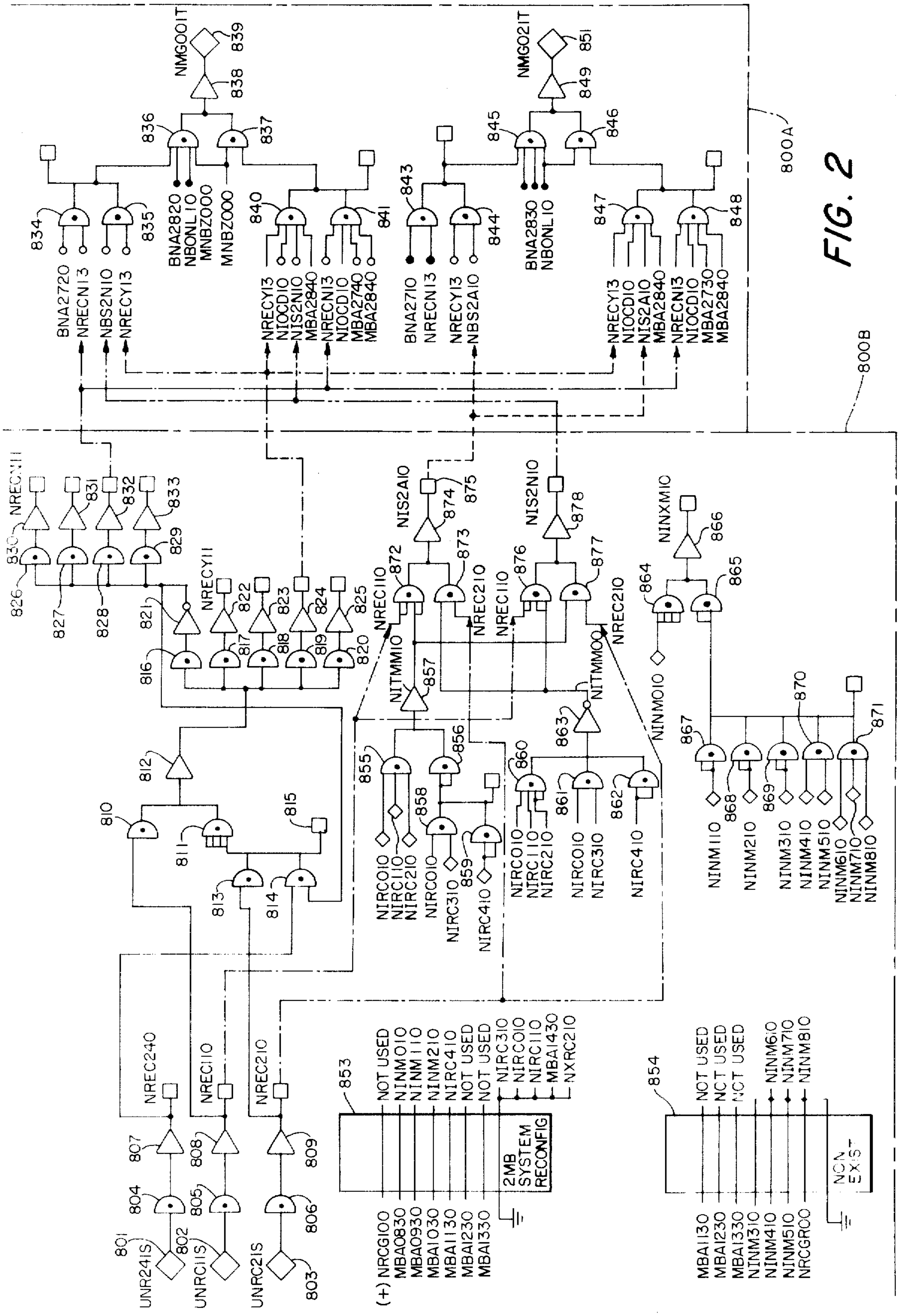
FIG. 2 is a detailed logic block diagram of a logic network for achieving the three configuration modes of main memory.

Referring to FIGS. 1A–1C and FIGS. 4A–4C there is shown three configurations of main memory store (MMS). FIGS. 1A and 4A are the normal mode of operation and illustrate modules 0–3 in a four-way interleaved addressing scheme. By referring to FIG. 4A it is seen that there are two address spaces 1, 2 shown for each of two 36 bit words in $MMS_0$ module 0. Similarly word address spaces 3 and 4 are in $MMS_1$ module 1, word address spaces 5 and 6 in $MMS_2$ module 2, and word address spaces 7 and 8 in $MMS_3$ module 3. The cycle then begins over again, with word address spaces 9 and 10 in MMS module 0 and so on for any number of words. In the normal mode of operation address space bits 27 and 28 are utilized to address any module in MMS. (See FIG. 3). In FIG. 3 it is shown that in normal operation bit positions 27 and 28 in combination are used for module select. Referring now once again to FIG. 4A it is shown that the combination of bit 27-not and bit 28-not addresses $MMS_0$; the combination of bit 27-not and bit 28 addresses $MMS_1$; the combination of bit 27 and 28-not addresses $MMS_2$; and the combination of bits 27 and 28 addresses $MMS_3$.

Referring to FIGS. 1B and 4B (valid only for a two megabyte system) there is shown the reconfigured mode R1. In this mode a fault is located in either modules 2 or 3 or in both modules 2 and 3 and hence are reconfigured so that modules 2 and 3 are in the upper half of the memory addressing range. Note by referring to FIG. 4B that each 36 bit word is organized so that words 1, 2, 3, and 4 are still in $MMS_0$ and $MMS_1$ respectively but that words 5, 6, 7, and 8 are no longer in $MMS_2$ and $MMS_3$ respectively but in $MMS_0$ and $MMS_1$ respectively. Note also that bit positions 11 and 28 are utilized to address any MMS module in reconfigured state R1 or R2. Hence in reconfigured state R1 bits 11-not and 28-not address module 0; bits 11-not and 28 address module 1, bits 11 and 28-not address module 2; and bits 11 and 28 address module 3.

FIGS. 1C and 4C illustrate in block diagram format reconfigured mode R2 wherein a fault is located in module 0 or module 1 or in module 0 and module 1. Note by referring to FIG. 4C that the organization of words usable by the user has shifted so that words 1, 2, 3, and 4 are in $MMS_2$ and $MMS_3$ respectively and also words 5, 6, 7, and 8 are in $MMS_2$ and $MMS_3$ respectively. This procedure is repeated for any number of words up to the capacity of the storage system.

Referring now to FIG. 3 there is shown the format for addressing modules and words in MMS both in the normal and reconfigured state. This format is for a two megabyte capacity system although similar type formats may be utilized for other capacities requiring a less number of bits for lower capacities, and a large number of bits for larger capacities. By examining FIG. 3 it will be seen that with the exception of the module select bits the word address bits to MMS are shifted to the left by one position in the reconfigured mode when compared to the normal mode. This represents a binary order of magnitude shift and permits addressing of the same total memory space addressed under normal mode, but relocating the user usable words into good memory i.e., that half of memory which does not have a fault. This permits the address words to progress through reconfigured memory in a similar manner as they did in memory in the normal state.

Referring now to FIG. 2 it will be shown how a reconfigured mode is selected, and how a particular module in the reconfigured mode is addressed. As an example, assume that the system is operating in reconfigured mode R1. Signals indicating the reconfigured mode desired are applied to pins 801, 802, and 803. If reconfigured mode R1 is desired, a signal UNRC11S applied to pin 802 is high, whereas if reconfigured mode R2 is desired a signal UNRCN21S is applied to pin 803. Signal UNR241S applied to pin 801 indicates, when it is high, that the CPU has requested that the memory be reconfigured in a two four-way interleaved mode. If, as in this example, reconfigured state R1 is desired then the signal from the CPU UNRC11S is high at pin 802. The high signal is distributed through AND gate 805, amplifier 808, AND gate 810, amplifier 812, AND gate 817, and amplifier 822 to generate signal NRECY11 indicating that the memory is reconfigured into reconfiguration state R1. To address any memory module in the reconfigured state of this two megabyte main memory store system, bits 11 and 28 are required in predetermined combinations discussed supra; FIGS. 4B and 4C show the combination of bits for addressing a particular module in the reconfigured state. Carrying through the example wherein we have assumed that it is desired to operate the system in reconfigured mode R1, and furthermore it is desired to address MMS. A signal MBA1130 is applied to a jumper cap 853; the signal MBA1130 indicates address bit 11 is applied to jumper cap 853 from this signal is developed in the IOC and is transmitted to the MSS. As shown on FIGS. 4B and 4C the particular combination of bits 11 and 28 in the pattern shown and discussed supra are utilized to select a desired module in reconfigured state R1 and R2. Bit 28 is applied on FIG. 2, gate 840 (MBAZ840). Signal MBA1130 (i.e., address bit 11 from the IOC to the MSS) emerges as signal NIRC410 (i.e., IOC reconfiguration bit number 4). Signal NIRC410 is applied to AND gates 859 and 862. Following the signal through AND gate 862 it is seen that it is enabled and applies the signal to inverter 863 and to one input of AND gate 876. The other input to AND gate 876 is signal NREC110 derived from signal UNRC11S and indicates reconfigured mode R1. (The dash-dot lines are included to make it more convenient to follow the path of various signals in reconfigured state R1). With both input signals on AND gate 876 high, it is enabled and a high signal is applied to amplifier 878 generating a signal NIS2N10 which indicates that the lower modules in the address range are selected. Signal NIS2N10 is applied to AND gate 840 as one of its inputs. The other input signals to AND gate 840 are described below. Signal NRECY13 is an input signal to AND gate 840 and indicates main memory is in a reconfigured state. Signal NRECY13 arrived to AND gate 840 via the following path: pin 802, AND gate 805, amplifier 808, AND gate 810, amplifier 812, AND gate 819, and amplifier 824. Another input signal applied to AND gate 840 is NIOCD10 which indicates that the input/output control unit (IOC) has control of the main storage sequencer (MSS). The final input signal to AND gate 840 is MBA2810 which indicates bit 28 is applied and is one of the bits necessary together with bit 11 to select module 2 in reconfigured state R1. With all these input signals high AND gate 840 is enabled and provides an input signal for AND gate 837. The other input signal to AND gate 837 is signal MNBZ200 which is high when the statement it represents, (i.e., main memory module 2 busy not) is true. Assuming module 2 is not busy signal MNBZ200 is high thus enabling AND gate 837 and applying a high signal to amplifier 838 thus generating a Go signal NMG001T for main memory module 2, i.e., MMS.

By similar analysis of FIG. 11A, it can be shown that any memory module can be addressed in any configuration.

Having shown and described a preferred embodiment of the invention those skilled in the art will realize that many variations and modifications may be made to produce the described invention and still be within the spirit and scope of the claimed invention.

GLOSSARY OF TERMS

| SIGNAL LOGIC NAME | DEFINITIONS |
|---|---|
| NBUFØ11 | BUFFER OR CP ASSIGNED FLAG SIGNAL 1 |
| NBUFØ12 | " " " 2 |
| NBUFØ13 | " " " 3 |
| NBUFØ15 | " " " 5 |
| NBUFØ16 | " " " 6 |
| NMA211R | MMS ADDRESS BITS 21 |
| NMA221R | " " " 22 |
| NMA231R | " " " 23 |
| NMG0Ø1Ø | MAIN MEMORY MODULE Ø GO SIGNAL |
| NMG011Ø | " " " 1 GO SIGNAL |
| NMG021Ø | " " " 2 GO SIGNAL |
| NMG031Ø | " " " 3 GO SIGNAL |
| MNBZØØØ | MAIN MEMORY MODULE Ø BUSY-NOT |
| MNBZ1ØØ | " " " 1 BUSY-NOT |
| MNBZ2ØØ | " " " 2 BUSY-NOT |
| MNBZ3ØØ | " " " 3 BUSY-NOT |
| UBAP33Ø | CP ADDRESS PARITY BIT 3 |
| NUA3B1Ø | CP ADDRESS BYTE 2 PARITY CHECK |
| UBA283Ø | CP ADDRESS BIT 28 |
| NCONL1Ø | CP ONLY ASSIGNED FLAG SIGNAL |
| NCPOD1Ø | CP GO DELAYED |
| NUS2N1Ø | CP LOWER MODULE SELECT FOR RECONFIGURED MODE |
| NUS2A1Ø | CP UPPER MODULE SELECT FOR RECONFIGURED MODE |
| NUGOR1Ø | CP GO RESET SIGNAL |
| MBAP23Ø | IOC ADDRESS PARITY CHECK BIT 2 |

| SIGNAL LOGIC NAME | DEFINITIONS |
|---|---|
| NIA3B1Ø | IOC ADDRESS BYTE 3 PARITY CHECK |
| NIOCØ1Ø | IOC CONTROL FUNCTION ASSIGNMENT FLAG |
| NIOCA2Ø | IOC ALONE NOT |
| NMIOR2Ø | IOC RESERVATION NOT |
| NIOCD1Ø | IOC GO DELAYED |
| NIS2N1Ø | IOC LOWER MODULE SELECT FOR RECONFIGURED MODE |
| NIS2A1Ø | IOC UPPER MODULE SELECT FOR RECONFIGURED MODE |
| NIOCT1Ø | IOC GO TO MSS |
| NBUFA2Ø | BUFFER ALONE-NOT |
| BNMGO1Ø | BUFFER GO |
| BNAP33Ø | BUFFER ADDRESS PARITY BIT 3 |
| NBA3B1Ø | BUFFER ADDRESS BYTE 3 PARITY CHECK |
| NBONL11 | BUFFER ONLY ASSIGNMENT FLAG SIGNAL |
| NMBGO1Ø | IOC GO SIGNAL TO BUFFER |
| MBRWS1Ø | IOC WRITE SIGNAL |
| NBS2N1Ø | BUFFER LOWER MODULE SELECT FOR RECONFIGURED MODE |
| NBS2A1Ø | BUFFER UPPER MODULE SELECT FOR RECONFIGURED MODE |
| NRECN13 | RECONFIGURATION MODE NOT |
| NRECY13 | MMS RECONFIGURED YES (Amplifier 3) |
| NRECN14 | MMS NON-RECONFIGURED MODE |
| NRECY14 | MMS RECONFIGURED YES (Amplifier 4) |
| NMSSZ1Ø | MMS BUSY |
| NAPCB1Ø | ADDRESS PARITY CHECK INHIBIT |
| NIAPC1Ø | IOC ADDRESS PARITY CHECK INHIBIT |
| NAPMD1Ø | ADDRESS PARITY MODE |
| NAP3Ø1Ø | IOC ADDRESS BYTE 3 PARITY CHECK |
| NMSSZ42 | MSS NOT BUSY |
| UBA273Ø | CP ADDRESS BIT 27 |
| NMA211T | ADDRESS BIT 21 TO MMS INTERFACE SIGNAL |
| NMA221T | " " 22 TO MMS INTERFACE SIGNAL |
| NMA231T | " " 23 TO MMS INTERFACE SIGNAL |

| SIGNAL LOGIC NAME | DEFINITIONS |
| --- | --- |
| NMA241T | " " 24 TO MMS INTERFACE SIGNAL |
| NMA251T | " " 25 TO MMS INTERFACE SIGNAL |
| NMA261T | " " 26 TO MMS INTERFACE SIGNAL |
| NMG0Ø1T | INTERFACE GO SIGNAL TO MSS MODULE 0 |
| NMG011T | " " " " " " 1 |
| NMG021T | " " " " " " 2 |
| NMG031T | " " " " " " 3 |
| XN21 | INTERFACE GO SIGNAL NOT USED TO MSS MODULE |
| XN21 | " " " " " " " " |
| MBA211S | IOC ADDRESS TO MSS BIT 21 |
| NMG0R1S | GENERAL GO RESET INTERNAL MSS |
| MBA221S | IOC ADDRESS BIT 22 TO MSS |
| MBA231S | " " " 23 TO MSS |
| MBA241S | " " " 24 TO MSS |
| MBA251S | " " " 25 TO MSS |
| MBA261S | " " " 26 TO MSS |
| MBA271S | " " " 27 TO MSS |
| MBA281S | " " " 28 TO MSS |
| NXU | NOT USED |
| MBAP21S | IOC ADDRESS PARITY BIT 2 TO MSS |
| MBAP31S | " " " " 3 TO MSS |
| MBG0R1S | MSS GO RESET TO IOC |
| MBRWS1S | IOC READ OR WRITE TO MSS |
| MBMG01S | IOC GO SIGNAL THRU MSS TO BUFFER |
| MMP481Ø | IOC WRITE DATA TO THE PARITY CHECKER BIT 48 |
| MMP491Ø | " " " " " " " " 49 |
| MMP501Ø | " " " " " " " " 50 |
| MMP511Ø | " " " " " " " " 51 |
| MMP521Ø | " " " " " " " " 52 |
| MMP531Ø | " " " " " " " " 53 |
| MMP541Ø | " " " " " " " " 54 |

| SIGNAL LOGIC NAME | DEFINITIONS |
|---|---|
| MMP551Ø | IOC WRITE DATA TO THE PARITY CHECKER BIT 55 |
| MMP561Ø | " " " " " " " " 56 |
| MMP571Ø | " " " " " " " " 57 |
| MMP581Ø | " " " " " " " " 58 |
| MMP591Ø | " " " " " " " " 59 |
| MMP6Ø1Ø | " " " " " " " " 60 |
| MMP611Ø | " " " " " " " " 61 |
| MMP621Ø | " " " " " " " " 62 |
| MMP631Ø | " " " " " " " " 63 |
| MMPP71Ø | IOC WRITE DATA PARITY CHECK BYTE 7 |
| NIBPØ1Ø | IOC BYTE Ø PARITY ERROR CHECK |
| NIBP11Ø | " " 1 " " " |
| NIBP21Ø | " " 2 " " " |
| NIBP31Ø | " " 3 " " " |
| NIBP41Ø | " " 4 " " " |
| NIBP51Ø | " " 5 " " " |
| MMBP61Ø | IOC WRITE DATA BYTE 6 PARITY |
| NBBPØ1Ø | BUFFER BYTE Ø PARITY ERROR CHECK |
| NBBP11Ø | " " 1 " " " |
| NBBP21Ø | " " 2 " " " |
| NBBP31Ø | " " 3 " " " |
| NBBP41Ø | " " 4 " " " |
| NBBP51Ø | " " 5 " " " |
| NBBP61Ø | " " 6 " " " |
| NBBP71Ø | " " 7 " " " |
| BNP481Ø | CP WRITE DATA TO THE PARITY CHECKER BIT 48 |
| BNP491Ø | " " " " " " " " 49 |
| BNP501Ø | " " " " " " " " 50 |
| BNP511Ø | " " " " " " " " 51 |
| BNP521Ø | " " " " " " " " 52 |
| BNP531Ø | " " " " " " " " 53 |
| BNP541Ø | " " " " " " " " 54 |

| SIGNAL LOGIC NAME | DEFINITIONS |
|---|---|
| BNP551Ø | " " " " " " " " 55 |
| BNP561Ø | CP WRITE DATA TO THE PARITY CHECKER BIT 56 |
| BNP571Ø | " " " " " " " " 57 |
| BNP581Ø | " " " " " " " " 58 |
| BNP591Ø | " " " " " " " " 59 |
| BNP601Ø | " " " " " " " " 60 |
| BNP611Ø | " " " " " " " " 61 |
| BNP621Ø | " " " " " " " " 62 |
| BNP631Ø | " " " " " " " " 63 |
| BNPP71Ø | CP WRITE DATA PARITY CHECK BYTE 7 |
| NICYC1Ø | IOC CYCLE INTERNALLY GENERATED |
| NCCYC1Ø | CP CYCLE INTERNALLY GENERATED |
| NBCYC1Ø | BUFFER CYCLE INTERNALLY GENERATED |
| NIETM1Ø | IOC WRITE ABORT LATCH |
| NINET1Ø | IOC RETRYABLE ERROR LATCH |
| NIAPB1Ø | IOC PARITY CHECK INHIBIT |
| MNIME1Ø | IOC MASK PARITY ERROR |
| NIWES1Ø | NON-RETRYABLE ERROR STROBE |
| NIOCØ34 | IOC CONTROL SIGNAL TO MSS |
| NCETM1Ø | CP WRITE ABORT LATCH |
| NCNET1Ø | CP RETRYABLE ERROR LATCH |
| NUAPB1Ø | CP PARITY CHECK INHIBIT |
| MNCME1Ø | CP MASK PARITY ERROR |
| NCWES1Ø | NON-RETRYABLE ERROR STROBE |
| NCPØØ36 | CP ASSIGNED CONTROL OF THE MSS |
| MNWAB1Ø | IOC WRITE ABORT |
| UBWAB3Ø | CPU WRITE ABORT |
| UNINT3Ø | CP INITIALIZE |
| NIDPC11 | INHIBIT DATA PARITY CHECK |
| NBETM1Ø | BUFFER WRITE ABORT LATCH |
| NMAKCØØ | MEMORY ACKNOWLEDGE CONTROL NOT |

| SIGNAL LOGIC NAME | DEFINITIONS |
|---|---|
| NIAKS2Ø | IOC ACKNOWLEDGE NOT |
| NBAKS2Ø | BUF. " " |
| NCAKS2Ø | CPU " " |
| NINXM1Ø | IOC NON-EXISTENT MEMORY CHECK |
| NIOCT1Ø | IOC GO SIGNAL |
| NUNXM1Ø | CP NON-EXISTENT MEMORY CHECK |
| NCPØØ16 | CP ASSIGNED CONTROL OF THE MSS |
| NBNXM1Ø | BUFFER NON-EXISTENT MEMORY CHECK |
| NBUFØ15 | BUFFER ASSIGNED CONTROL OF THE MSS |
| NUSEC1Ø | CP SINGLE ERROR CORR. |
| NBNER1Ø | BUFFER NON-RETRYABLE ERROR |
| NBERS1Ø | BUFFER ERROR STROBE |
| NBRER1Ø | BUFFER RE-TRYABLE ERROR |
| NIBP61Ø | IOC BAD BYTE 6 PARITY CHECK |
| NIBP71Ø | " " " 7 " " |
| NBBP61Ø | BUFFER BYTE 6 PARITY ERROR CHECK |
| NBBP71Ø | " " 7 " " " |
| NMACK1Ø | IOC ACKNOWLEDGE |
| NBACK1Ø | BUF. " |
| NUACK1Ø | CPU " |
| NMBZØØØ | MMS MODULE Ø BUSY NOT |
| NMBZ1ØØ | " " 1 " " |
| NMBZ2ØØ | " " 2 " " |
| NMBZ3ØØ | " " 3 " " |
| NTACK1Ø | MMS ACKNOWLEDGE WHICH RESETS MSS BUSY |
| NBNEM1Ø | BUFFER NON-EXISTENT MEMORY CHECK |
| NIAPC1Ø | INHIBIT ADDRESS PARITY CHECK |
| NIDPC1Ø | INHIBIT DATA PARITY CHECK |
| NIDPC3Ø | " " " " |

| SIGNAL LOGIC NAME | DEFINITIONS |
|---|---|
| NBRDS1Ø | BUF/CP READ STROBE |
| NREC11Ø | RECONFIGURATION MODE R1 |
| NREC21Ø | RECONFIGURATION MODE R2 |
| NRECY11 | MMS RECONFIGURATION MODE DRIVER 1 |
| NRECY12 | " " " " 2 |
| NRECY13 | " " " " 3 |
| NRECY14 | " " " " 4 |
| NRECN11 | MMS NON-RECONFIGURATION MODE DRIVER 1 |
| NRECN12 | " " " " " 2 |
| NRECN13 | " " " " " 3 |
| NRECN14 | " " " " " 4 |
| NBNET1Ø | BUF. NON-RECONFIGURATION ERROR LATCH STROBE 1 |
| MBAØ83Ø | IOC TO MSS ADDRESS BIT 8 |
| MBAØ930 | " " " " " 9 |
| MBA1Ø3Ø | " " " " " 10 |
| MBA113Ø | " " " " " 11 |
| MBA123Ø | " " " " " 12 |
| MBA133Ø | " " " " " 13 |
| MBA143Ø | " " " " " 14 |
| NBS2A1Ø | BUF. UPPER MODULE SELECT IN RECONFIGURED MODE |
| NBS2N1Ø | BUF. LOWER MODULE SELECT IN RECONFIGURED MODE |
| NINXM1Ø | IOC NON-EXISTENT MEMORY CHECK |
| NUNXM1Ø | CP " " " " |
| NBNXM1Ø | BUF. " " " " |
| NINM21Ø | IOC NON-EXISTENT MEMORY CHECK BIT 2 |
| NINM11Ø | " " " " " " 1 |
| NINMØ1Ø | " " " " " " Ø |
| XØØ | GROUND |
| NRCG1ØØ | LOGICAL 1 |
| MBAØ83Ø | IOC TO MSS ADDRESS BIT 8 |
| MBAØ93Ø | " " " " " 9 |

| SIGNAL LOGIC NAME | DEFINITIONS |
|---|---|
| MBA1Ø3Ø | IOC TO MSS ADDRESS BIT 1Ø |
| MBA113Ø | " " " " " 11 |
| MBA123Ø | " " " " " 12 |
| MBA133Ø | " " " " " 13 |
| MBA143Ø | " " " " " 14 |
| NIRCØ1Ø | IOC RECONFIGURATION BIT 0 |
| NIRC11Ø | " " " 1 |
| NIRC21Ø | " " " 2 |
| NIRC31Ø | " " " 3 |
| NIRC41Ø | " " " 4 |
| NUNM21Ø | CP NON-EXISTENT MEMORY CHECK BIT 2 |
| NUNM11Ø | " " " " " " 1 |
| NUNMØ1Ø | " " " " " " Ø |
| NURCØ1Ø | CP RECONFIGURATION BIT Ø |
| NURC11Ø | " " " 1 |
| NURC21Ø | " " " 2 |
| NURC31Ø | " " " 3 |
| NURC41Ø | " " " 4 |
| NBNM21Ø | BUFFER NON-EXISTENT MEMORY CHECK BIT 2 |
| NBNM11Ø | " " " " " " 1 |
| NBNMØ1Ø | " " " " " " Ø |
| NBRC21Ø | BUFFER RECONFIGURATION BIT 2 |
| BNA143Ø | CP/BUFFER ADDRESS BIT 14 |
| NBAC11Ø | BUFFER RECONFIGURATION BIT 1 |
| NBRCØ1Ø | " " " Ø |
| NBRC31Ø | " " " 3 |
| NBRC41Ø | " " " 4 |
| NINM31Ø | IOC NON-EXISTENT MEMORY CHECK BIT 3 |
| NINM41Ø | " " " " " " 4 |
| NINM51Ø | " " " " " " 5 |
| NINM81Ø | " " " " " " 8 |

| SIGNAL LOGIC NAME | DEFINITIONS |
|---|---|
| NINM71Ø | " " " " " " 7 |
| NINM61Ø | " " " " " " 6 |
| NUNM41Ø | CP NON-EXISTENT MEMORY CHECK BIT 4 |
| NUNM51Ø | " " " " " " 5 |
| NUNM31Ø | " " " " " " 3 |
| NUNM81Ø | " " " " " " 8 |
| NUNM71Ø | " " " " " " 7 |
| NUNM61Ø | " " " " " " 6 |
| NBNM41Ø | BUFFER NON-EXISTENT MEMORY CHECK BIT 4 |
| NBNM51Ø | " " " " " " 5 |
| NBNM81Ø | " " " " " " 8 |
| NBNM71Ø | " " " " " " 7 |
| NBNM61Ø | " " " " " " 6 |
| NUMRE1S | MMS TO CP READ DATA ERROR |
| NURER1S | MMS TO CP RETRYABLE ERROR |
| NUNER1S | MMS TO CP NON-RETRYABLE ERROR |
| NUWRC1S | MMS TO CP WRITE CANCELLED |
| UNMMN1S | CP MODE REQUEST (-1) |
| UNMMØ1S | CP MODE REQUEST Ø |
| UNMM11S | CP MODE REQUEST 1 |
| UNMM21S | CP MODE REQUEST 2 |
| NUNEM1S | MMS TO CP NON-EXISTENT MEMORY |
| UNR241S | CP TO MMS RECONFIGURED MODE |
| UNRC11S | CP TO MMS RECONFIGURED MODE |
| NMACK1S | MMS TO I/O MEMORY ACKNOWLEDGE |
| NMRDS1S | MMS TO I/O READ STROBE |
| NMRER1S | MMS TO I/O RETRYABLE STROBE |
| NMNER1S | MMS TO I/O NON-RETRYABLE ERROR |
| NMERS1S | MMS TO I/O ERROR STROBE |
| NMWRC1S | MMS TO I/O WRITE CANCELLED |

| SIGNAL LOGIC NAME | DEFINITIONS |
|---|---|
| MNACK1T | MMS TO MSS ACKNOWLEDGE INTERFACE SIGNAL |
| MNRDS1T | MMS TO MSS READ STROBE INTERFACE SIGNAL |
| MNRER1T | MMS TO MSS RETRYABLE ERROR INTERFACE SIGNAL |
| MNNER1T | MMS TO MSS NON-RETRYABLE ERROR INTERFACE SIGNAL |
| MNERS1T | MMS TO MSS ERROR STROBE INTERFACE SIGNAL |
| MNWRC1T | MMS TO MSS WRITE CANCELLED INTERFACE SIGNAL |
| MNSEC1T | MMS TO MSS SINGLE ERROR CORRECT INTERFACE SIGNAL |
| NMMMØ1T | MSS TO MMS DIAGNOSTIC MODE BIT 0 INTERFACE SIGNAL |
| NMMM11T | MSS TO MSS DIAGNOSTIC MODE BIT 1 INTERFACE SIGNAL |
| NMMM21T | MSS TO MMS DIAGNOSTIC MODE BIT 2 INTERFACE SIGNAL |
| MNBZØ1T | MMS TO MSS MODULE 0 BUSY INTERFACE SIGNAL |
| MNBZ11T | " " " " 1 " " " |
| MNBZ21T | " " " " 2 " " " |
| MNBZ31T | " " " " 3 " " " |
| BNAØ83Ø | CPU/BUFFER TO MSS ADDRESS BIT 8 |
| BNAØ93Ø | " " " " " " 9 |
| BNA1Ø3Ø | " " " " " " 10 |
| BNA113Ø | " " " " " " 11 |
| BNA123Ø | " " " " " " 12 |
| BNA133Ø | " " " " " " 13 |
| BNA143Ø | " " " " " " 14 |
| BNA153Ø | " " " " " " 15 |
| BNA163Ø | " " " " " " 16 |
| BNA173Ø | " " " " " " 17 |
| BNA183Ø | " " " " " " 18 |
| BNA193Ø | " " " " " " 19 |
| BNA2Ø3Ø | " " " " " " 20 |
| BNA213Ø | " " " " " " 21 |
| BNA223Ø | " " " " " " 22 |
| BNA233Ø | " " " " " " 23 |

| SIGNAL LOGIC NAME | DEFINITIONS |
|---|---|
| MBAØ83Ø | IOC TO MSS ADDRESS BIT 8 |
| MBAØ93Ø | " " " " " 9 |
| MBA1Ø3Ø | " " " " " 10 |
| MBA113Ø | " " " " " 11 |
| MBA123Ø | " " " " " 12 |
| MBA133Ø | " " " " " 13 |
| MBA143Ø | " " " " " 14 |
| MBA153Ø | " " " " " 15 |
| MBA163Ø | " " " " " 16 |
| MBA173Ø | " " " " " 17 |
| MBA183Ø | " " " " " 18 |
| MBA193Ø | " " " " " 19 |
| MBA2Ø3Ø | " " " " " 20 |
| MBA213Ø | " " " " " 21 |
| MBA223Ø | " " " " " 22 |
| MBA233Ø | " " " " " 23 |
| MBA243Ø | " " " " " 24 |
| MBA253Ø | " " " " " 25 |
| MBA263Ø | " " " " " 26 |
| MBA273Ø | " " " " " 27 |
| MBA283Ø | " " " " " 28 |
| NBAPB1Ø | BUFFER ADDRESS PARITY CHECK |
| NIAPB1Ø | IOC " " " |
| NUAPB1Ø | CPU " " " |
| MBAP11S | IOC ADDRESS BYTE 1 PARITY BIT |
| MBAP23Ø | " " " 2 " " |
| NIA1B1Ø | IOC ADDRESS BYTE 1 PARITY CHECK |
| NIA2B1Ø | " " " 2 " " |
| NIA3B1Ø | " " " 3 " " |
| NIAPC1Ø | INHIBIT ADDRESS PARITY CHECK |

| SIGNAL LOGIC NAME | DEFINITIONS |
|---|---|
| NAP1Ø1Ø | MMS ADDRESS BYTE 1 PARITY CHECK |
| NAP2Ø1Ø | " " " 2 " " |
| BNAP13Ø | BUFFER ADDRESS BYTE 1 PARITY BIT |
| BNAP23Ø | " " " 2 " " |
| NBA1B1Ø | BUFFER ADDRESS BYTE 1 PARITY CHECK |
| NBA2B1Ø | " " " 2 " " |
| NBA3B1Ø | " " " 3 " " |
| UNMKØ3Ø | CP WRITE MASK BIT 0 |
| UNMK13Ø | " " " " 1 |
| UNMK23Ø | " " " " 2 |
| UNMK33Ø | " " " " 3 |
| UNMK43Ø | " " " " 4 |
| UNMK53Ø | " " " " 5 |
| UNMK63Ø | " " " " 6 |
| UNMK73Ø | " " " " 7 |
| NNP481Ø | MAIN MEMORY DATA PARITY CHECK BIT 48 |
| NNP491Ø | " " " " " " 49 |
| NNP5Ø1Ø | " " " " " " 50 |
| NNP511Ø | " " " " " " 51 |
| NNP521Ø | " " " " " " 52 |
| NNP531Ø | " " " " " " 53 |
| NNP541Ø | " " " " " " 54 |
| NNP551Ø | " " " " " " 55 |
| NNP561Ø | " " " " " " 56 |
| NNP571Ø | " " " " " " 57 |
| NNP581Ø | " " " " " " 58 |
| NNP591Ø | " " " " " " 59 |
| NNP6Ø1Ø | " " " " " " 60 |

| SIGNAL LOGIC NAME | DEFINITIONS |
|---|---|
| NNP611Ø | MAIN MEMORY DATA PARITY CHECK BIT 61 |
| NNP621Ø | " " " " " " 62 |
| NNP631Ø | " " " " " " 63 |
| NNPP71Ø | MAIN MEMORY DATA PARITY CHECK BYTE 7 |
| NNPP61Ø | " " " " " " 6 |
| MNWRB1Ø | IOC WRITE ABORT |
| NMIOR2Ø | IOC RESERVATION NOT |
| MBRWS1Ø | IOC READ/WRITE SIGNAL |
| UNRWS1Ø | CP " " " |
| UNINT3Ø | CP INITIALIZE |
| UNWAR3Ø | CP WRITE ABORT |
| NCWAB1Ø | WRITE ABORT |
| NIWAB1Ø | IOC WRITE ABORT |
| NIAPC1Ø | IOC ADDRESS PARITY CHECK INHIBIT |
| MNIME1Ø | IOC NON-RETRYABLE ERROR LATCH |
| UNMXP3Ø | CP WRITE MASK PARITY BIT |
| MNCME1Ø | CP NON-RETRYABLE ERROR LATCH |
| NIDPC1Ø | INHIBIT DATA PARITY CHECK |
| NMBP61Ø | READ DATA BYTE 6 PARITY CHECK |
| NMBP71Ø | " " " 7 " " |
| NIOCD1Ø | IOC GO DELAYED |
| NMAKS1Ø | MEMORY ACKNOLWEDGE SIGNAL |
| NINBY1Ø | IOC CYCLE IN MSS |
| NCPØØ15 | IOC CONTROL FUNCTION |
| NCNBY1Ø | CP CYCLE IN MSS |
| NBUFØ15 | BUFFER CONTROL FUNCTION |
| NBNBY1Ø | BUFFER CYCLE IN MSS |
| NETMS1Ø | CONTROL FROM TIMING |
| NCETR1Ø | CP CONTROL FOR ERROR |
| NIETR1Ø | IOC CONTROL FOR ERROR |
| NBETR1Ø | BUFFER CONTROL FOR ERROR |
| NCNET1Ø | CPU NON-RETRYABLE ERROR CONTROL |

| SIGNAL LOGIC NAME | DEFINITIONS |
|---|---|
| NBNET1Ø | BUFFER N.R. ERROR |
| NIAKS2Ø | IOC ACKNOWLEDGE NOT |
| NCAKS2Ø | CP " " |
| NBAKS2Ø | BUF. " " |
| NIRDS1Ø | IOC READ STROBE |
| NIRDR1Ø | " " CONTROL |
| NCRDS1Ø | CPU READ STROBE |
| NCRDR1Ø | " " CONTROL |
| NBRDS1Ø | BUFFER READ STROBE |
| NBRDR1Ø | " " CONTROL |
| NIRDL1Ø | READ DATA PARITY CONTROL ERROR |
| NCRDL1Ø | " " " " " |
| NIPCS1Ø | IOC READ DATA COMPARE |
| NIPCR1Ø | " " " " CNTL. |
| NCPCS1Ø | CP " " " |
| NCPCR1Ø | CP " " " CNTL. |
| NBPCS1Ø | BUF. " " " |
| NBPCR1Ø | " " " " CNTL. |
| NIPCL1Ø | IOC RETRYABLE ERROR STROBE |
| NCPCL1Ø | CPU " " " |
| NBPCL1Ø | BUF. " " " |
| MMWØØ3Ø | IOC WRITE DATA BIT 0 |
| MMWØ13Ø | " " " " 1 |
| MMWØ23Ø | " " " " 2 |
| MMWØ33Ø | " " " " 3 |
| MMWØ43Ø | " " " " 4 |
| MMWØ53Ø | " " " " 5 |
| MMWØ63Ø | " " " " 6 |
| MMWØ73Ø | " " " " 7 |
| MMWØ83Ø | " " " " 8 |
| MMWØ93Ø | " " " " 9 |
| MMW1Ø3Ø | " " " " 10 |

| SIGNAL LOGIC NAME | DEFINITIONS |
|---|---|
| MMW113Ø | IOC WRITE DATA BIT 11 |
| BNWØØ1Ø | CP WRITE DATA BIT 0 |
| BNWØ11Ø | " " " " 1 |
| BNWØ21Ø | " " " " 2 |
| BNWØ31Ø | " " " " 3 |
| BNWØ41Ø | " " " " 4 |
| BNWØ51Ø | " " " " 5 |
| BNWØ61Ø | " " " " 6 |
| BNWØ71Ø | " " " " 7 |
| BNWØ81Ø | " " " " 8 |
| BNWØ91Ø | " " " " 9 |
| BNW1Ø1Ø | " " " " 10 |
| BNW111Ø | " " " " 11 |
| NNRØØ1Ø | MAIN MEMORY READ DATA BIT 0 |
| NNRØ11Ø | " " " " " 1 |
| NNRØ21Ø | " " " " " 2 |
| NNRØ31Ø | " " " " " 3 |
| NNRØ41Ø | " " " " " 4 |
| NNRØ51Ø | " " " " " 5 |
| NNRØ61Ø | " " " " " 6 |
| NNRØ71Ø | " " " " " 7 |
| NNRØ81Ø | " " " " " 8 |
| NNRØ91Ø | " " " " " 9 |
| NNR1Ø1Ø | " " " " " 10 |
| NNR111Ø | " " " " " 11 |
| MMPØØ1Ø | IOC WRITE DATA PARITY CHECK BIT 0 |
| MMPØ11Ø | " " " " " " 1 |
| MMPØ21Ø | " " " " " " 2 |
| MMPØ31Ø | " " " " " " 3 |

| SIGNAL LOGIC NAME | DEFINITIONS |
|---|---|
| MMPØ41Ø | IOC WRITE DATA PARITY CHECK BIT 4 |
| MMPØ51Ø | " " " " " " 5 |
| MMPØ61Ø | " " " " " " 6 |
| MMPØ71Ø | " " " " " " 7 |
| MMPPØ1Ø | IOC WRITE DATA PARITY CHECK BYTE 0 |
| NNPØØ1Ø | MAIN MEMORY PARITY CHECK BIT 0 |
| NNPØ11Ø | " " " " " 1 |
| NNPØ21Ø | " " " " " 2 |
| NNPØ31Ø | " " " " " 3 |
| NNPØ41Ø | " " " " " 4 |
| NNPØ51Ø | " " " " " 5 |
| NNPØ61Ø | " " " " " 6 |
| NNPØ71Ø | " " " " " 7 |
| NNPPØ1Ø | MAIN MEMORY PARITY CHECK BYTE 0 |
| NMLVC1Ø | IOC WRITE DATA CONTROL |
| NBLVC1Ø | CP WRITE DATA CONTROL |
| NICYCØØ | IOC MEMORY CYCLE |
| NBCYCØØ | BUFFER MEMORY CYCLE |
| MMBPW1Ø | IOC BYTE PARITY |
| NIBPØ1Ø | IOC BAD BYTE PARITY |
| NBBPØ1Ø | BUFFER BAD BYTE PARITY |
| NMBPØ1Ø | MEMORY BAD BYTE PARITY |
| NIDPC1Ø | INHIBIT DATA PARITY CHECK |
| NBNØØ1Ø | BUFFER READ DATA BIT 0 |
| NBNØ11Ø | " " " " 1 |
| NBNØ21Ø | " " " " 2 |
| NBNØ31Ø | " " " " 3 |
| NBNØ41Ø | " " " " 4 |
| NBNØ51Ø | " " " " 5 |
| NBNØ61Ø | " " " " 6 |
| NBNØ71Ø | " " " " 7 |
| NBNØ81Ø | " " " " 8 |

| SIGNAL LOGIC NAME | DEFINITIONS |
|---|---|
| NBNØ91Ø | BUFFER READ DATA BIT 9 |
| NBN1Ø1Ø | " " " " 10 |
| NBN111Ø | " " " " 11 |
| NBUFA20 | BUFFER THE ONLY USER PERMITTED NOT |
| NIOCD10 | IOC GO SIGNAL DELAYED |
| NCPOD10 | CP GO SIGNAL DELAYED |
| NIOCT21 | IOC GO SIGNAL |
| NBMGOOO | BUFFER GO SIGNAL |
| NIOCA1Ø | IOC ONLY |
| NMIOR1Ø | RESERVE MSS FOR THE IOC |
| NMSSZ1Ø | MSS BUSY |
| NBUFO1Ø | MSS ASSIGNED TO BUFFER |
| NBSIN10 | BUFFER SAMPLE INHIBIT SIGNAL |
| NRECY34 | MAIN MEMORY IN RECONFIGURED MODE |
| NRECN34 | MAIN MEMORY IN NORMAL CONFIGURATION MODE |
| NIWBK20 | IOC TO PERFORM WRITE NOT |
| UNMGO10 | GO SIGNAL ISSUED BY THE CPU |

What is claimed is:

1. In combination with a computer memory system comprised of four memory modules arranged in an four-way interleaved addressing configuration mode, an electrical reconfiguration network for dynamically varying under program control the configuration mode of said four memory modules from four way interleaved addressing configuration to two-way interleaved addressing configuration where *k* is an integer equal to *m*/2, said reconfiguration network comprising:

a. first circuit means responsive to first predetermined bits in a first instruction from a program under execution for generating first reconfiguration signals, indicative of a desired predetermined state of interleaved addressing configuration;

b. second circuit means responsive to second predetermined addressing bit positions in a second instruction of a program under execution for generating second reconfiguration signals;

c. third means, responsive to said second means, for addressing predetermined ones of said four modules in normal four-way interleaved addressing configuration; and d. fourth circuit means, coupled to said first and second circuit means, for dynamically varying, in response to said first or second reconfiguration signals, the configuration mode of said four modules from four-way interleaved addressing configuration to two-way interleaved addressing.

2. The combination as recited in claim 1 wherein said four-way interleaved addressing mode is a normal mode and the two-way interleaved addressing mode is a reconfigured mode and wherein there are two reconfigured modes R1 and R2.

3. The combination as recited in claim 2 wherein the four memory modules in the normal four-way mode are $MMS_0$, $MMS_1$, $MMS_2$ and $MMS_3$ and wherein reconfigured mode R1 comprises $MMS_2$ and $MMS_3$ occupying a first half of the total addressable space and $MMS_0$ and $MMS_1$ occupying a second half of the total addressable space.

4. The combination as recited in claim 3 wherein the reconfigured mode R2 comprises $MMS_0$ and $MMS_1$ occuppying the first half of the total addressable space and $MMS_2$ and $MMS_3$ occupying the second half of the total addressable space.

5. The combination as recited in claim 4 being reconfiguration mode R1 and is utilized when a fault is located in either module $MMS_2$ or $MMS_3$ or in both $MMS_2$ and $MMS_3$, and reconfiguration mode R2 being utilized when a fault located in either module $MMS_0$ or $MMS_1$ or in both $MMS_0$ and $MMS_1$.

6. A method of reconfiguring a computer memory system comprised of four memory modules arranged in a four-way interleaved addressing configuration mode, to a two-way interleaved addressing configuration, said method comprising the steps of:

a. generating, in response to first predetermined bits from a first instruction of a program under execution, first reconfiguration signals indicative of a desired predetermined state of interleaved addressing configuration;

b. generating, in response to predetermined address bit positions of a second instruction of a program under execution, second reconfiguration signals for addressing any one of said four modules in any one of said two-way interleaved addressing configurations; and, c. applying said first or second reconfiguration signals to said computer memory system to control said computer memory system for varying the four-way interleaved addressing configuration mode to two-way interleaved addressing configuration.

* * * * *